United States Patent Office 3,113,724
Patented Dec. 10, 1963

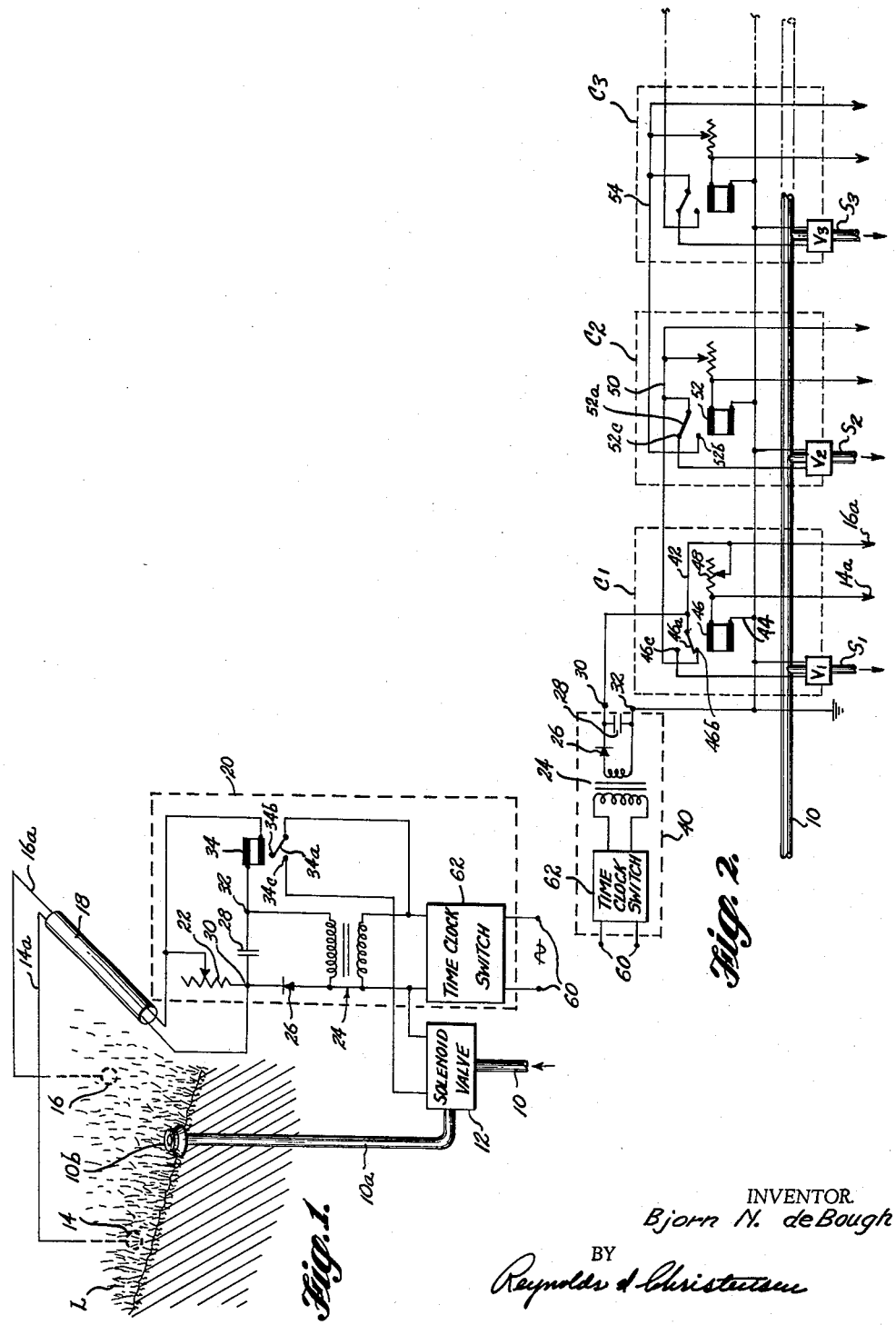

3,113,724
AUTOMATIC WATERING SYSTEMS
Bjorn N. de Bough, 8011 1st St. NE., Seattle, Wash.
Filed Apr. 16, 1962, Ser. No. 187,491
3 Claims. (Cl. 239—63)

This invention relates to improvements in automatic sprinkling or irrigation systems and more particularly to those of the type employing valve or pump operating means responsive to variations in current flow between sensing electrodes embedded in the soil. The invention is herein illustratively described by reference to the presently preferred embodiments thereof; however, it will be recognized that certain modifications and changes therein with respect to details may be made without departing from the essential features involved.

In automatic watering systems of the above-described type, there has been a problem with respect to achieving consistently reliable operation with sensitivity under the widely variant conditions encountered in different types of soils and under different conditions of soil treatment, such as those which result from using certain kinds of fertilizers, insecticides, etc. The various types of soils and treatment chemicals used affect the electrical properties of the soil in terms of the response of any moisture sensing apparatus which relies upon current flow between embedded probes or electrodes to which sensing voltage is applied. It is an important object of this invention to devise a simple, reliable and adjustable moisture detection system of the described type which in any of its adjustive settings provides the desired capability of detecting percentage moisture content of the soil. Furthermore, nonlinearity of soil impedance as a function of applied electrode voltage is not a problem with the improved sensing circuit.

A further object of this invention is to provide an improved automatic sprinkling or irrigation control system which may incorporate a series of watering stations all supplied from a single source of water and each automatically controlled in response to separate moisture sensing apparatus associated with the particular station. It is a specific object to provide a coordinated system of this nature in which water will be discharged at only one station or a limited number of stations at a time rather than at all stations or an unpredictable number of stations simultaneously. Stations of lower priority needing water will not be turned on by their control devices in each instance when stations of higher priority needing water are being satisfied. Thus, predictable discharge pressures and flow rates are achieved based on operating design requirements of the stations as related to the capacity limitations of the water source and station delivery conduits.

In such a multistation time sharing system operating from a single water source, it is thus an object to achieve a simple and reliable interlock or disabling means which coordinates the functioning of succeeding watering stations in conjunction with operation of their respective moisture detecting circuit elements. A further object is to provide such a system employing simple, economical and readily available components.

In accordance with this invention, across the opposing soil electrodes of a station a voltage source is connected in series with an electrically energizable control element, and such control elements for the several stations are connected in parallel with a variable electrical impedance. The control element, such as a relay, operates a valve, pump or other watering device. By adjusting the value of this impedance the apparatus may be made to respond to any of different percentage values of soil moisture, and by virtue of the parallel connection between the electrodes and control impedance nonlinearity of soil impedance does not impair the sensitivity nor the linearity of response of the operating circuit for the watering control device.

In the illustrative multistation soil watering system embodiment, sensing electrode circuits of the character described above control the valving (or pumping) of water in accordance with the individual requirements of each station. Moreover, the electrically energizable control element by which watering is controlled at the first station preempts the water supply while a moisture deficiency is sensed by the first station electrode pair. This is accomplished by interlock means, such as successively dependent energizing circuits associated with the successive control devices, and operative to prevent energization of the control elements of succeeding stations in the series until preceding stations are satisfied. However, when the moisture requirements of the first station are satisfied, releasing its control element from actuated condition, the first station interlock is automatically removed, permitting a next succeeding station to preempt the water in like manner, assuming its sensing electrodes then detect a moisture deficiency, and in so doing to operate the second station interlock, which prevents succeeding stations from interfering with the necessary full and sufficient delivery of water to the second station. In like manner succeeding stations in turn take priority in a certain order over those which follow, until the watering requirements of all the stations are met.

These and other features, objects and advantages of the invention will become more fully evident from the following description thereof by reference to the accompanying drawings.

FIGURE 1 is a simplified schematic diagram of a single station watering system incorporating certain features of the invention.

FIGURE 2 is a schematic diagram of a multistation watering system incorporating similar features and additional features of the invention.

Referring to FIGURE 1, the water source is represented by the supply conduit 10 which leads through the solenoid controlled valve 12 to the conduit 10a to which is connected the sprinkling head 10b, for example. The conduit 10a may be branched or may serve a multiplicity of sprinkling heads associated with one station, or it may be adapted to serve any other form of water discharge device, whether in sprinkling or irrigation systems. In this case the sprinkling head 10b is depicted as a single conventional lawn sprinkler set flush with or slightly below the surface of the lawn L.

Beneath the lawn two electrodes 14 and 16 are embedded in spaced relationship in the soil. These electrodes may be of any suitable shape or size and are normally small disk-like elements, of the order of two inches in diameter, spaced apart by a distance of the order of six feet. Small electrodes at this relatively large spacing are found to detect the average moisture condition of the soil over a substantial area and not to be influenced critically by localized pockets or seams of moisture which could falsely indicate a moisture condition differing greatly from the true average condition. Energizing leads 14a and 16a are connected to the respective electrodes 14 and 16 preferably through a conductor shield 18 extending from the electric circuit apparatus 20. The latter is or may be part of a remote control unit associated with the solenoid valve 12 or otherwise suitably located and housed. Within the electrical unit is a variable resistance 22 connected directly in shunt across the conductors 14a and 16a, hence directly across the electrodes 14 and 16. A direct-voltage source is comprised by the secondary winding of transformer 24 and the rectifier 26 and associated filtering condenser 28. The direct-voltage source terminals are designated 30 and 32. Across these terminals a relay winding 34 is connected serially with the pair of electrodes 14 and 16, such that the relay will become sufficiently energized to move its contact arm 34a from the normally engaged closed contact 34c into engagement with the open contact 34b when there is sufficient soil moisture to produce that value of energizing current in the relay coil. Thus, under deficient moisture conditions the relay remains continuously deactuated and its contact 34c engaged so as to energize valve 12 to the open setting.

The setting of variable resistance 22 connected in shunt to the electrodes 14 and 16 determines the percentage of moisture in the soil at which the relay 34 is actuated and deactuated during soil moisture increase and decrease, respectively. When the resistance 22 is set at a very small value the relay 34 will become actuated only in response to a very high percentage moisture in the soil, whereas when the resistance 22 is set at a larger value a correspondingly smaller amount of moisture in the soil will be sufficient to operate the relay.

The primary of transformer 24 is energized with alternating current from the supply terminals 60 either directly or through a time clock switch 62 of conventional or suitable form. The function of the time clock switch in systems of this nature is, of course, to limit the periods of time during which watering the lawn L can occur, independently of moisture content in the soil.

Referring to FIGURE 2, a time clock switch 62, transformer 24, rectifier 26 and condenser 28 are mounted in the remote power supply unit 40 which is common to all of the remote station units C1, C2, C3, etc. The supply conduit 10 in this case extends to the different stations. Normally closed watering valves V1, V2, V3, etc., installed at the respective stations are separately operable in order to divert water into the associated branch conduits S1, S2, S3, etc., as required. The station control circuits are devised with priority interlocks for purposes previously mentioned. Thus, when first-station valve V1 is operated to divert water through the watering pipe S1, neither of valves V2 or V3 can operate. Likewise, if water is not flowing through pipe S1 and moisture is required at the second station C2, valve V2 will operate. When it does operate an electrical interlock is formed preventing operation of valve V3. In this manner a predictable and sufficient flow of water to any station in operation is assured, without impairment by the effect of other stations attempting to draw water at the same time. This is necessary so that sprinkling equipment will function properly and so that moisture will be delivered to the soil surrounding the station at a sufficiently rapid rate to soak into the soil effectively with minimum evaporation loss and satisfy the soil moisture requirements of the station in minimum time.

The coordinative interlock circuits operatively associated with the moisture sensing and watering control circuits will now be described. Voltage supply output terminals 30 and 32 in FIGURE 2 are connected to the energization conductors 42 and 44 of the first station apparatus C1. Relay winding 46 and variable resistance 48 are serially connected across conductors 42 and 44, whereas the first station soil electrode leads 14a and 16a are connected directly across the variable resistance 48. When soil moisture is above the minimum requirements for station C1 relay 46 remains energized by soil current, and its contact arm 46a remains engaged with contact 46b. It thus establishes an energizing connection between the power supply output terminal 30 and the energization conductor 50 of the second station circuit apparatus C2, thereby permitting operation of the second station. Likewise, as long as the relay coil 52 in the latter station apparatus remains energized by sufficiency of soil moisture, its contactor 52a remains engaged with the stationary contact 52b to establish an energizing connection to the energization conductor 54 of the next succeeding station circuit apparatus C3. This relationship repeats in succeeding stations, if any, in the series. However, if the first station electrode leads 14a, 16a cease carrying current sufficient to hold relay 46 energized, its contactor 46a is released and engages the alternative stationary contact 46c causing energization of the solenoid valve V1 and the delivery of water through the discharge pipe S1. At the same time, disengagement of stationary contact 46b interrupts supply of voltage to energization conductor 50 in the second station circuit C2 and in all succeeding station circuits so that no other station can operate its watering valve while the valve V1 is held in the operating position. In like manner, when any succeeding station is permitted to operate its watering valve, there is interruption of voltage to the energization conductors of the stations beyond.

These and other aspects of the invention will be recognized by those skilled in the art on the basis of the foregoing description of the present embodiments thereof.

I claim as my invention:

1. In a soil watering system comprising a pair of mutually opposing moisture sensing electrodes which in use are buried in spaced relation in the soil, and soil watering means operatively connected in the system; a voltage source, a control device having an electrically energizable control element serially connected with said source across said electrodes, and variable electrical impedance means connected in parallel with said electrodes, across the series combination of said source and control element, said soil watering means being operatively associated with said control device and operable to effect a change in the flow of water in the system in response to a predetermined change of energization of said control element responsive to a change of current flow in the soil between said electrodes.

2. In a soil watering system comprising a pair of mutually opposing moisture sensing electrodes adapted to be buried in spaced relation in the soil, and soil watering means operatively connected in the system; a direct voltage source, a control device having an electrically energizable control element serially connected with said source across said electrodes, and variable electrical resistance means connected in parallel with said electrodes, across the series combination of said source and control element, said soil watering means being operatively associated with said control device and operable to effect a change in the flow of water in the system in response to a predetermined change of energization of said control element responsive to a change of current flow in the soil between said electrodes.

3. In a multistation soil watering system comprising a water source with conduit means to conduct water therefrom to a series of watering stations, and separate watering control valve means at the respective stations to control discharge of water to the soil in the vicinity of each such station; the combination comprising pairs of mutually opposing moisture sensing electrodes buried in spaced relation in the soil in the vicinities of the respective stations, control devices at the respective stations, each having an electrically energizable control element and two-position switch means operable thereby from a normal position to a displaced position and having normally engaged contacts and alternatively engageable contacts, a power supply, energization conductors at each station across which the associated station control elements and paired electrodes are connected, the energization conductors of a first station in the series being connected across said power supply, the energization conductors of succeeding stations in the series being connected to the respectively preceding station energization conductors interruptably through the normally engaged switch means contacts of the latter conductors, said separate watering control valve means at the respective stations being connected to the conduit means and operatively associated with the corresponding station control devices to be operated to discharge water by engagement of the alternatively engageable contacts of the associated individual switch means as the switch means operates to disconnect succeeding station energization conductors from said power supply, said individual station control elements and paired electrodes being connected serially across the associated station energization conductors, and means at each station to vary sensitivity of its control element to soil moisture, comprising a variable impedance connected directly in shunt with the station's paired electrodes.

References Cited in the file of this patent

UNITED STATES PATENTS

| | | |
|---|---|---|
| 2,611,643 | Higgins | Sept. 23, 1952 |
| 2,695,976 | Hasenkamp | Nov. 30, 1954 |
| 2,796,291 | Mueller | June 18, 1957 |
| 2,812,976 | Hasenkamp | Nov. 12, 1957 |
| 3,037,704 | Kinigsberg et al. | June 5, 1962 |